United States Patent
Proulx et al.

(10) Patent No.: US 6,938,214 B2
(45) Date of Patent: Aug. 30, 2005

(54) DYNAMICALLY CONFIGURABLE HUMAN-MACHINE INTERFACE

(75) Inventors: Lorraine Proulx, Kanata (CA); Dominique Trudeau, Orleans (CA); Sasa Nijemcevic, Nepean (CA)

(73) Assignee: Alcatel Canada Inc., Kanata (CA)

(*) Notice: Subject to any disclaimer, the term of this patent is extended or adjusted under 35 U.S.C. 154(b) by 536 days.

(21) Appl. No.: 10/072,909

(22) Filed: Feb. 12, 2002

(65) Prior Publication Data

US 2003/0112275 A1 Jun. 19, 2003

(30) Foreign Application Priority Data

Dec. 19, 2001 (CA) .............................................. 2365501

(51) Int. Cl.[7] .............................................. G06F 15/00
(52) U.S. Cl. ..................................... 715/763; 715/765
(58) Field of Search ................................ 715/763, 765, 715/853, 854; 345/762, 763, 765, 853, 854

(56) References Cited

U.S. PATENT DOCUMENTS 6,091,411 A * 7/2000 Straub et al. ............... 345/747
6,721,747 B2 * 4/2004 Lipkin ......................... 707/10

* cited by examiner

Primary Examiner—Cao Nguyen
(74) Attorney, Agent, or Firm—Marks & Clerk

(57) ABSTRACT

A framework is presented to provide support for dynamically configuring a human-machine interface in a network management and service provisioning environment. The framework implements a file parser, methods of accessing a managed object server to interact with instances of managed data network entity objects, a multitude of view panel components and a command interpreter. A multitude of run-time loadable descriptor files are provided to specify the functionality, of view panel instances used by an analyst manipulate information in interacting with the network management and service provisioning environment. The parser is used to load descriptor files and instantiate view panels on demand. Advantages are derived from a separation between network management and service provisioning software application coded functionality and the specification of the human-machine interface presented to the analyst, providing for improved development, maintenance and deployment of the network management and service provisioning solution.

18 Claims, 6 Drawing Sheets

800

| ( EntityFilterMakeListSplitPanel ) | | | | — | X |
|---|---|---|---|---|---|
| Filter Criteria | Filter Value | Operation1 | Operation2 | | |
| FilterOption1 | FilterValue10 | AND | + | △ | |
| FilterOption2 | FilterValue8 | XOR | − | | |
| FilterOption3 | FilterValue3 | OR | − | | |
| FilterOption3 | ( not used ) | | | | |
| . . . | . . . | . . . | . . . | ▽ | |

| Make List | Stop | | | | |
|---|---|---|---|---|---|
| # | Entity Specification | Entity Identifier | Status | Uptime | Alarms |
| 1 | ─── | ─── | Online | 11:26 | None |
| 2 | ─── | ─── | Offline | 00:00 | High |
| 3 | ─── | ── | Online | 23:07 | Low |
| 4 | | | | | |
| 5 | | | | | |

FIG. 7  700

( EntityConfigPanel )

EntityIdentifier
EntityType
NetworkAddress

ServiceAssociation

[General] [Layer-3] [Layer-2] [Layer-1]

Parameter1
Parameter2

Action1

OK
Save
Cancel
Help
Test

FIG. 9  900

DYNAMICALLY CONFIGURABLE HUMAN-MACHINE INTERFACE

FIELD OF THE INVENTION

The invention relates to network management and service provisioning, and in particular to methods of providing a dynamically configurable network management and service provisioning solution.

BACKGROUND OF THE INVENTION

In the field of data network management, data transport networks are made up of a collection of managed data transport equipment. Data services are provisioned over the managed data transport equipment.

In a competitive market place, due to a recent explosive technological development, the network management and service provisioning task is complicated by many factors including: multiple data network equipment vendors having multiple approaches in implementing the data network equipment; a multitude of data transport technologies, with each vendor specializing in a sub-group of the multitude of data transport technologies; a multitude of network management and service provisioning protocols, with each vendor implementing only a sub-group of the multitude of network management and service provisioning protocols; a multitude of auxiliary network management and service provisioning equipment employing yet another multitude of network management and service provisioning technologies; etc.

Data transport equipment includes, but is not limited to: data switching equipment, routers, bridges, access nodes providing a multiplexing function, Remote Access Servers (RAS), distribution nodes providing a demultiplexing function, Customer Premise Equipment (CPE), etc. with next generation data transport equipment in development.

With regards to data network equipment, for example data switching nodes schematically shown in FIG. 1, a vendor may chose to implement an integral device 110 having a data switching processor and a group of ports 112, while another vendor may chose a customizable implementation of a data switching node 120 including: a switching fabric, an equipment rack divided into shelves, each shelf 122 having slot connectors for connection with interface cards, each interface card 124 having at least one port 112. Although conceptually the two the data switching nodes 110 and 120 provide the same data switching function, each implementation is adapted for a different environment: the former data switching node 110 is more adapted to enterprise solutions as a private data network node, perhaps further adapted to enable access to public data services; while the latter data switching node 120 is better adapted for high data throughput in the core of public data transport networks. Typically the former (110) implements a small number of data transport protocols while for the latter (120), data transport protocols are implemented on interface cards 124 and/or ports 112—providing for a flexible deployment thereof. All data network equipment is subject to design choices which are bound to be different from vendor to vendor.

Data transport technologies include: electrical transmission of data via copper pairs, coaxial cable, etc: optical transmission of data via optical cables; free space optical interconnects, etc.; wireless transmission of data via radio modems, microwave links, wireless Local Area Networking (LAN), etc.; with next generation data transport technologies under development.

Data transport protocols used to convey data between data transport equipment includes: Internet Protocol (IP), Ethernet technologies, Token-Ring technologies, Fiber Distributed Data Interface (FDDI), Asynchronous Transmission Mode (ATM), Synchronous Optical NETwork (SONET) transmission protocol, Frame Relay (FR), X-25, Time Division Multiplexing (TDM) transmission protocol, Packet-Over-SONET (POS), Multi-Protocol Label Switching (MPLS), etc. with next generation data transport protocols in development.

The physical data network equipment alluded to above is part of larger body of managed data network entities enabling the provision of data services. The data network entities also include, but are not limited to: virtual routers, logical ports, logical interfaces, end-to-end data links, paths, virtual circuits, virtual paths, etc.

Network management and service provisioning enabling technologies include, but are not limited to protocols: Simple Network Management Protocol (SNMP), Common Management Information Protocol (CMIP) etc.; as well as devices: special function servers, centralized databases, distributed databases, relational databases, directories, network management systems, etc. with next generation devices and technologies under development.

Network management and service provisioning solutions include Network Management Systems (NMS) 130 enabled via special purpose software applications coded to configure and control the above mentioned data network entities. Such software applications include, but are not limited to: inventory reporting, configuration management, statistics gathering, performance reporting, fault management, network surveillance, service provisioning, billing & accounting, security enforcement, etc.

It is a daunting task to provide network management and service provisioning solutions taking into account the permutations and combinations of the elements presented above. Prior art approaches to providing network management and service provisioning solutions include the coding of hundreds of software applications with knowledge of hundreds of data networking entities using tens of data transmission and network management protocols. Some prior art solutions attempt to code all-encompassing large monolithic network management and service provisioning software applications.

Coding, deploying, maintaining, and extending such software applications for network management and service provisioning has been and continues to be an enormous undertaking as well as an extremely complex procedure. Such software applications require a large number of man-hours to create, frequently are delivered with numerous problems, and are difficult to modify and/or support. The difficulty in creating and supporting large applications is primarily due to the inability of existing software development paradigms to provide a simplification of the software development process. In accordance with current coding paradigms, the complexity of the software applications has been shown to increase as an exponential function of the number of different operations that are expected to be performed. Large programming efforts suffer in terms of reasonable performance, reliability, cost of development, and reasonable development cycles.

Object Oriented Programming (OOP) attempts to improve productivity whenever a problem can be simplified by decomposing it into a set of black-box objects. Object oriented programming depends heavily upon the benefits of data hiding, inheritance, and polymorphism to simplify software design. If a network management and service provisioning solution cannot be subdivided into objects, object oriented programming does not offer significant productivity improvements. Moreover, heavy reliance on object oriented programming to achieve compact code intending to reduce the size of software applications and perhaps development time, suffers from deeply nested function calls which creates a processing overhead leading to inefficient code. Deep nesting of function calls obscures the implementation paradigms used; thereby negatively impacting code debugging, code maintenance, and further development thereof.

Of special interest to the description herein is human-machine interface programming for information display to analysts interacting with NMS systems 130. Every data network entity has operational parameters associated therewith. Associations between data network entities are also made to enable: service provisioning (signaling, data transport, billing, etc.), providing redundancy (equipment, transport, bandwidth, etc.) as well as providing network management related data transport (network status updates, alarms, etc.) The amount of configuration and/or surveillance information associated with even the simplest of managed data transport networks tends to be very large. The information is typically divided up and presented to the analyst selectively in accordance with a context of network management and service provisioning. The selected information is presented to the analyst for visual inspection typically using view panels.

Object oriented programming techniques are used to implement very basic displayable elements known as widgets. Widgets include: icons, pull-down menus, buttons, selection boxes, progress indicators, on-off checkmarks, scroll bars, window frames, window manipulators, toggle buttons, sliders, tabs, and many other displayable elements for displaying information and for inviting, accepting, and responding to actions performed by an analyst.

Prior art efforts including: Preside™ by Nortel Networks Corp., IP Manager™ by Cisco Systems Inc., OneVision Management System™ by Lucent Technologies Inc., Net-Provision Activator by Syndesis Limited, Resolve 2.1 by Orchestream Holdings Plc., and others, capture the: properties, associations, relationships, functionality and management of data network entities, as well as methods of interaction therewith in providing network management and service provisioning solutions into large monolithic software applications.

These efforts are all laudable, but at the same time, these solutions include hard-coded human-machine interfaces making it difficult to develop, extend and/or modify as necessary to add support for newly developed data network entities, new data transport protocols, new network management and service provisioning technologies, new contexts of network management and service provisioning etc. Further these solutions include hard-coded rules pertaining to valid actions that can be performed on data network entities as well as hard-coded rules pertaining to valid value ranges for each operational parameter thereof. The rules form part of what is know in the art as domain logic.

The productivity of the development and maintenance of such current complex software applications for network management and service provisioning suffers. In particular, view panels providing selective display of information have to be coded anew, the whole software application needs to be re-compiled and re-deployed to provide support for additional and/or updated data network entities. There is always a risk of causing errors in existing code when dealing with such large software applications thereby requiring extensive regression testing to verify the integrity of the existing code.

Other prior art network management and service provisioning solutions include the use of element management software. Element management software typically provides command line access to configuration of operational parameters. Element management software is typically provided by equipment vendors to enable configuration of specific data network equipment sold. Such attempts suffer from the use of a large number of element management software applications, an inconsistent human-machine interface and a lack of a data network wide view of the managed data network entities in providing network management and service provisioning solutions.

There therefore is a need to devise improved methods of software application code development and maintenance taking into account the above mentioned complexities.

SUMMARY OF THE INVENTION

In accordance with an aspect of the invention, a graphical user interface framework is presented. The framework implements: at least one generic view panel component, a file parser, and machine logic. The framework makes use of at least one view panel descriptor file including information specifying the configuration of the at least one generic view panel component. The framework uses the parser to load the at least one descriptor file at run-time. The machine logic selectively configures the at least one generic view panel component in accordance with the specification detailed in the at least one descriptor file to display at least one view panel instance on a display interface. The use of the at least one generic view panel component and the run-time loading of the at least one descriptor file by the framework for run-time configuration thereof provides for a dynamic configuration of the display interface.

In accordance with another aspect of the invention, the framework further makes use of a command interpreter processing received commands in selectively configuring the at least one generic view panel.

In accordance with a further aspect of the invention, the framework further includes a registration facility registering at least one application module. The at least one application module interoperates with the machine logic in selectively configuring the at least one generic view panel component.

In accordance with a further aspect of the invention, a method of configuring a human-machine interface is provided. The method comprises a sequence of steps. An interaction context requiring a view panel to be displayed is determined. A descriptor file associated with the interaction context is selected to configure an instance of the view panel component prior to displaying the view panel. The run-time configuration of view panel components provides for a dynamic configuration of the human-machine interface.

In accordance with a further aspect of the invention, the method includes further steps in which the determination of the interaction context is determined from particulars of at least one command received by a framework implementing the method. The particulars of the at least one command are extracted using a command interpreter. The particulars of the received command may be made available to application modules registered with the framework; and at least one application module determines the interaction context.

In accordance with yet another aspect of the invention, the view panel instance may include a combination of view panel components.

A plurality of run-time loadable descriptor files are typically used to specify the functionality, look-and-feel of view panel instances presented on a human-machine interface used by an analyst to manipulate information. Instances of view panels created on demand include but are not limited to: list display, list filtering, tree display, parameter inspection, entity creation, entity configuration forms, etc.

Advantages are derived from a separation between network management and service provisioning software application coded functionality and the specification of the interface presented to the analyst. The separation also provides for an efficient development, maintenance and deployment of the network management and service provisioning solution. The modularity provided results in relaxed dependencies among source files, among development efforts to enable a faster parallel development. A simplification of the development of network management and service provisioning solutions is achieved while reducing requirements for regression testing.

BRIEF DESCRIPTION OF THE DRAWINGS

The features and advantages of the invention will become more apparent from the following detailed description of the preferred embodiments with reference to the attached diagrams wherein:

FIG. 3 is a schematic diagram showing a managed entity object hierarchy used in providing the network management and service provisioning solution in accordance with the preferred embodiment of the invention;

FIG. 4 is a schematic diagram showing an managed entity containment hierarchy used in providing the network management and service provisioning solution in accordance with the preferred embodiment of the invention;

FIG. 7 is a schematic diagram showing, in accordance with an exemplary implementation of the invention, a dynamically configurable view panel in support of a dynamically configurable human-machine interface;

FIG. 9 is another schematic diagram showing, in accordance with an exemplary implementation of the invention, another dynamically configurable view panel in support of a dynamically configurable human-machine interface.

It will be noted that in the attached diagrams like features bear similar labels.

DETAILED DESCRIPTION OF THE EMBODIMENTS

Figure 1:
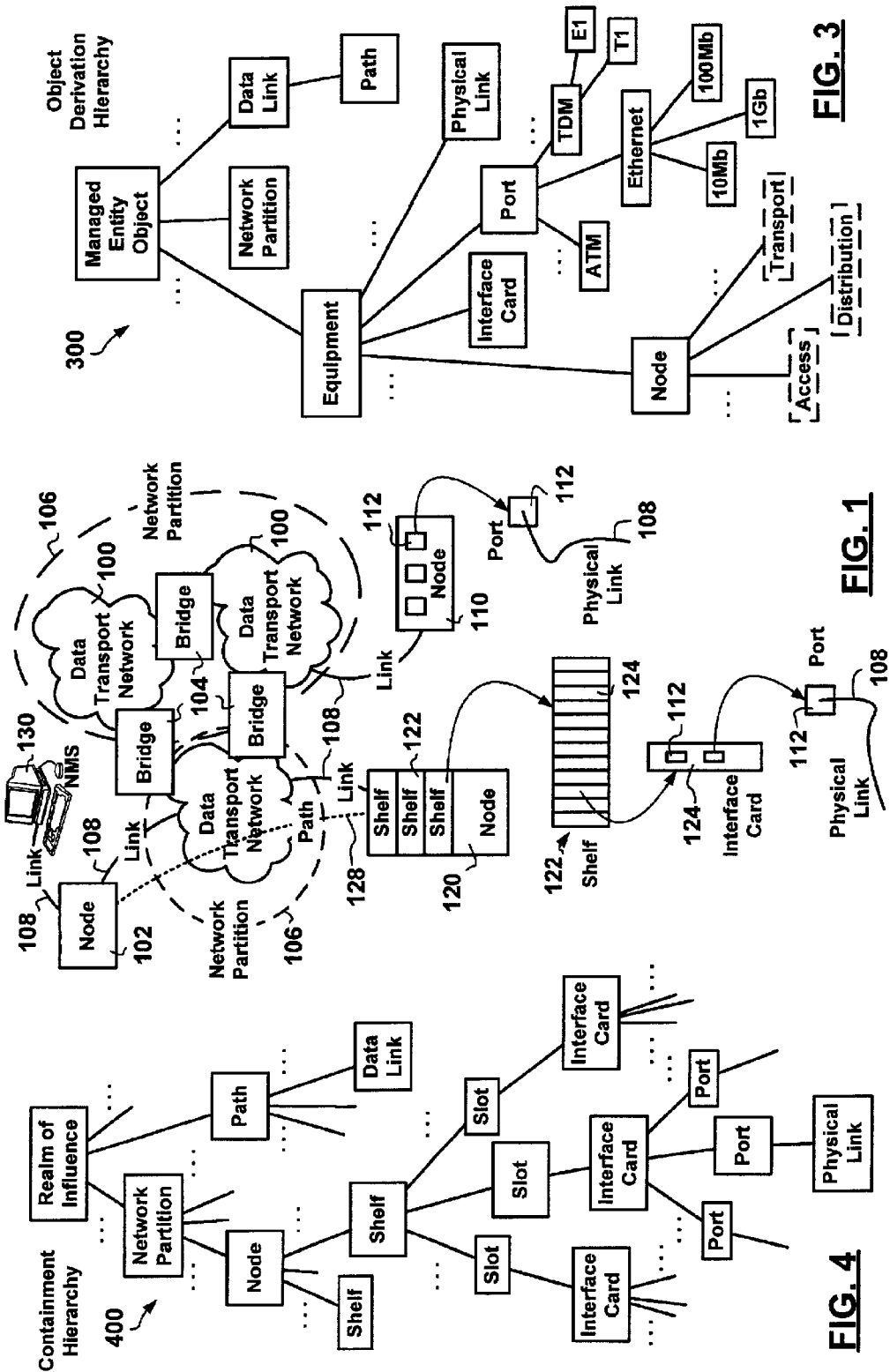
FIG. 1 is a schematic diagram showing data network elements implementing connected data transport networks.

FIG. 1 is a schematic diagram showing data network elements implementing connected data transport networks.

Data network nodes 102, 110, 120 are physically interconnected in the data transport network 100 via physical links 108. Data transport networks 100 may be bridged via bridge data network nodes 104 to enable data exchange therebetween. Connected data transport networks 100 can be grouped defining areas of focus and influence for the purposes of network management and service provisioning, known as network partitions 106.

Physical links 108 provide Open Systems Interconnection (OSI) Layer-1 connectivity between data network nodes 102/104/110/120 physically conveying data for OSI Layer-2 data links between nodes 102/110/120 end-to-end. A Layer-2 data link may be provisioned over at least one physical data link 108—the sequence of physical data links 108 used representing an OSI Layer-3 path 128.

Network management and service provisioning is typically performed with the aid of at least one Network Management System (NMS) 130 connected to at least one node 102 associated with a data transport network 100.

Figure 2:
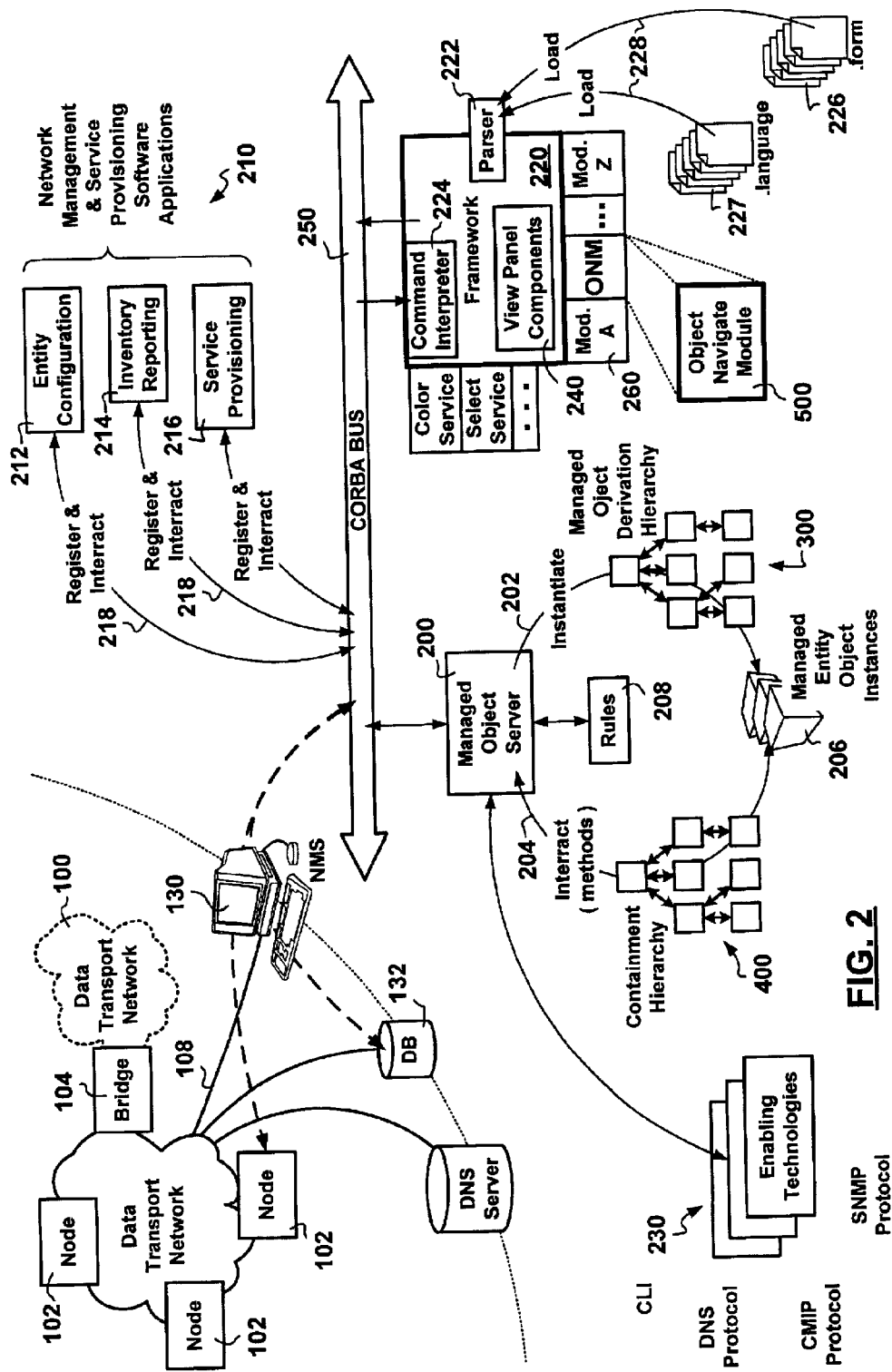
FIG. 2 is a schematic diagram showing elements implementing a network management and service provisioning solution in accordance with a preferred embodiment of the invention.

FIG. 2 is a schematic diagram showing elements implementing a network management and service provisioning solution.

In accordance with a preferred embodiment of the invention, a framework 220 is provided. The framework 220 may include a combination of hardware and software application code. The framework 220 facilitates the implementation of a software development methodology for coding complex software applications 210 relating to network management and service provisioning.

A Managed Object Server (MOS) 200 implements an architecture for providing network management and service provisioning solutions. The architecture categorizes the above presented elements into:

Manageable data network entities representative of field installed managed data network entities to be configured and controlled in providing network management and service provisioning solutions. The managed entities include:
  i. Physical data network equipment installed in the field such as: nodes 102/104, routers, switches, hubs, OC-3 links 108, etc., and
  ii. Logical data network entities associated with data network equipment installed in the field such as: network partitions 106, paths 128, virtual circuits, virtual routers etc.;

Network management and service provisioning software applications 210 used to configure and control the manageable data network entities. The software applications 210 include as mentioned above: inventory reporting 214, configuration management 212, statistics gathering, performance reporting, fault management, network surveillance, service provisioning 216, billing & accounting, security enforcement, etc.;

Network management enabling technologies 230 providing interaction with manageable entities such as logical and field installed physical managed data network entities. Enabling technologies 230 include:
  i. Data network management and service provisioning protocols: SNMP, CMIP, CLI, DNS, etc., and
  ii. Data network management and service provisioning devices: databases, DNS servers, etc.

The interaction enabled via the MOS 200 may be command driven as specified by the software application 210, as well as event driven as a current state of the managed data transport network(s) in the realm of influence changes.

The enabling technologies 230 include support for a concept known as "persistence". Each data network entity including data network equipment has an associated group of parameters. These parameters either have an effect on the operation of the data network entity or label the data network entity. The persistence concept encompasses the storage of, access to, reading, writing, modifying, synchronization/ reconciliation, etc. of persistence parameters to control the operation of data network entities.

The persistence parameters can be stored in a network management and service provisioning database 132, as well as in registers associated with the managed physical data network equipment installed in the field. The persistence access to, reading of, writing of, modification of these parameters is provided via the data network management and service provisioning protocols mentioned above. Persistence reconciliation and synchronization is performed between a persistence database and a persistence value held in a volatile register ensuring a correct record keeping thereof, fast access to the persisted information and backup thereof. Distributed storage of persistence information is also used in reconfiguring data network equipment subsequent to network failures.

The persistence concept also encompasses special persistence types such as: constant persistence which can only be initialized but not subsequently modified or written to; as well as derived persistence which is not stored but rather calculated from other persistence values when needed.

Further information regarding persistence entity support is provided in co-pending U.S. patent application Ser. No. 10/021,080 filed on Dec. 19, 2001, entitled "NETWORK MANAGEMENT SYSTEM ARCHITECTURE" which is incorporated herein by reference.

In accordance with the preferred embodiment of the invention, the framework 220 does not interact with the database 132 directly but rather via the MOS 200. The MOS 200 makes use of a managed data network entity object derivation hierarchy 300 to instantiate 202 and interact 204 with managed entity object instances 206. An exemplary managed object derivation hierarchy is presented in FIG. 3. Instantiated managed entity objects 206 form a containment hierarchy 400 an example of which is presented in FIG. 4.

In accordance with a preferred embodiment of the invention, a group of generic view panel components 240 are defined to provide support for a dynamically configurable human-machine interface. The generic view panel components 240 provide support for the display of selected context-sensitive information for inspection by the analyst as well as provides front end processing of input. The generic view panel components 240 include, but are not limited to:

an entity listing component enabling the presentation of data network entities having common characteristics;

an entity list filtering component enabling the sifting of entities listed by an entity listing component to hide unwanted listed data network entities;

an entity tree creation component presenting (hierarchical) associations and relationships between data network entities for navigation though connectivity information;

an entity parameter inspection component providing operational parameter browsing and editing—entity parameter inspection component derived view panels may also be used for data network entity context-less configuration;

an entity inclusion/creation component for instantiation of managed data network entity objects managed via the MOS 200;

an entity configuration component for changing a state of at least one data network entity in the realm of management of the network management and service provisioning solution—entity configuration component derived view panels are used for data network entity configuration subject to a context;

a validation component for interacting with the MOS 200 to validate ranges of parameters selected;

a commit component for interacting with the MOS 200 in implementing configuration changes; etc.

In accordance with the invention, the generic view panel components are instantiated, combined, and configured at run time to provide the analyst with a network management and service provisioning context specific interface for interaction therewith in performing network management and service provisioning actions. Other generic view panel components may be developed independent of or in combination with the above mentioned components to extend the functionality provided by the framework 220. For example, a further statistical information display component may be used in presenting statistical information to the analyst.

Figure 6:
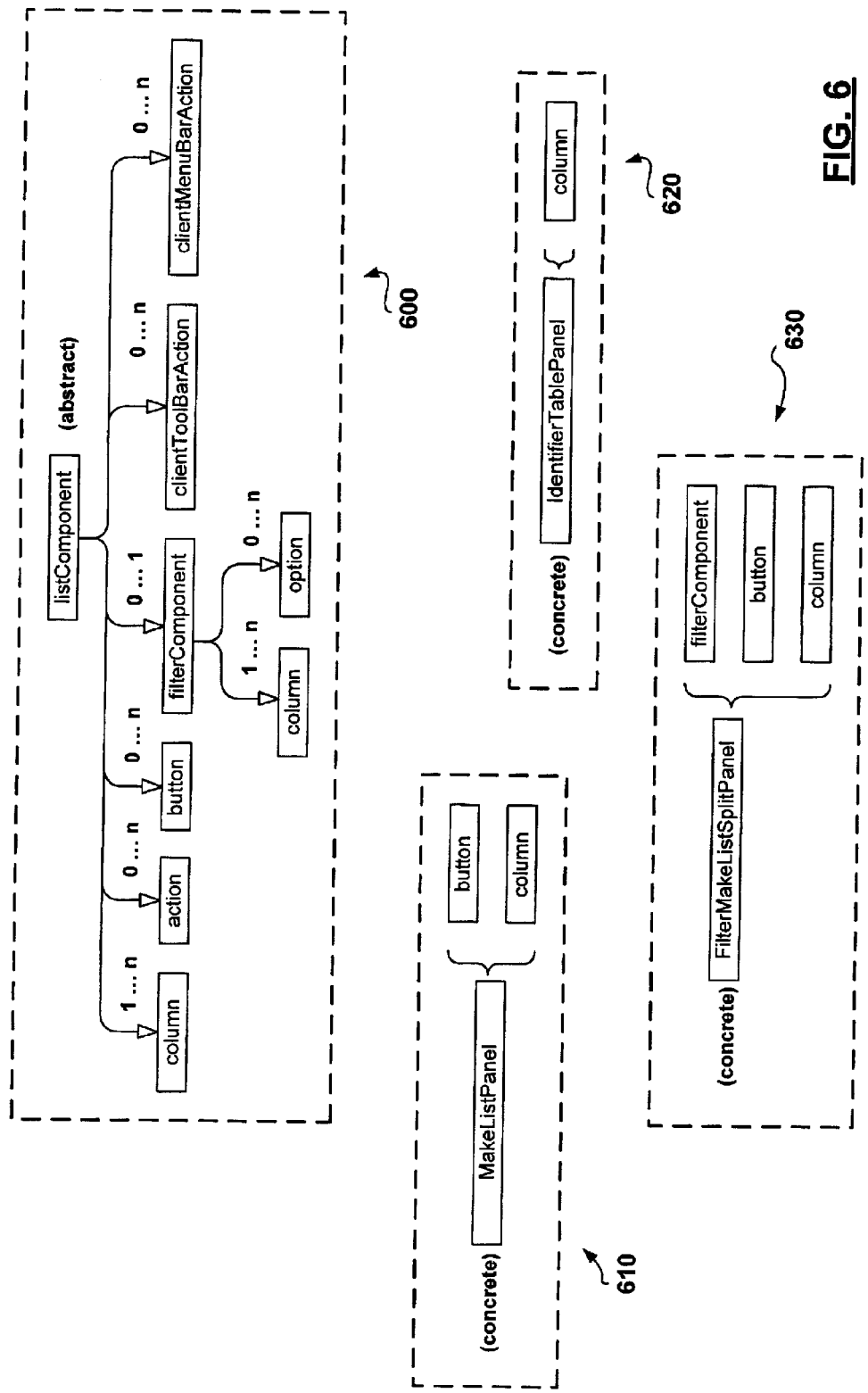
FIG. 6 is a schematic diagram showing, in accordance with an exemplary embodiment of the invention, associations of data entities implementing a software component enabling a dynamically configurable human-machine interface.

FIG. 6 shows an exemplary generic abstract implementation of a view panel component enabling entity listing in support of a dynamically configurable human-machine interface. In particular, the presented implementation of the entity listing component 600 is a combination of view panel components inheriting functionality of the entity list filtering view panel component. Concrete derived entity listing view panel components 610, 620 and 630 are also shown. FIG. 7 is a schematic diagram showing, in accordance with an exemplary implementation of the invention, a generic dynamically configurable view panel used in listing data network entities subject to filtering options in support of a dynamically configurable human-machine interface. The generic view panel shown corresponds to an instance of the entity listing view panel component 630.

Figure 8:
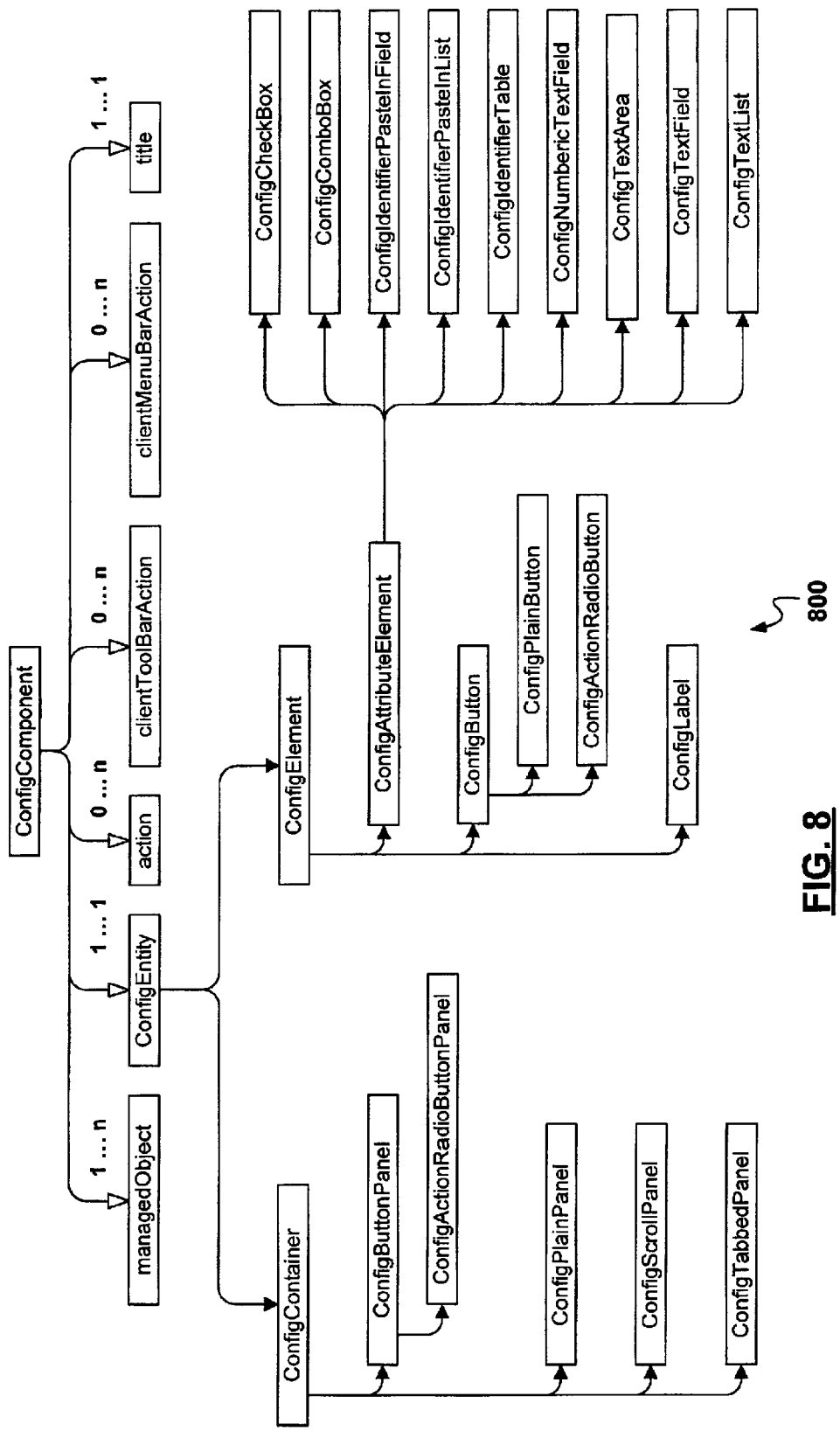
FIG. 8 is another schematic diagram showing, in accordance with an exemplary embodiment of the invention, associations of data entities implementing another software component enabling a dynamically configurable human-machine interface.

FIG. 8 is another exemplary generic abstract implementation of a view panel component enabling entity configuration in support of a dynamically configurable human-machine interface. FIG. 9 is another schematic diagram showing, in accordance with an exemplary implementation of the invention, another generic dynamically configurable view panel used in configuring data network entities in support of a dynamically configurable human-machine interface.

In accordance with the preferred embodiment of the invention, a group of run-time loadable view panel configuration description files 226, hereinafter referred to as ".form" descriptor files 226, are provided. Each one of the .form files 226 is a human-readable source code file consolidating all relevant particulars to a particular view panel used in a particular network management and service provisioning context. Each .form file 226 specifies: the look-and-feel of an associated view panel, widget attributes, etc.

In accordance with the preferred embodiment of the invention, each one of the .form files 226 may be edited at run-time and run-time re-loaded by the framework 220 to change the functionality, presentation, etc. of the associated view panel. For this purpose the framework 220 includes a .form file parser 222.

The use of the parser 222 at development, provides a troubleshooting tool for interface related issues in coding network management and service provisioning solutions without the need to re-compile and re-link edited code. After deployment, the use of the parser 222 provides for modifying and extending deployed network management and software provisioning solutions at reduced costs.

Other benefits provided by the parser 222 and the .form files 226 are realized from an improved ability to internationalize the interface presented to the analyst. The internationalization of the interface refers to the presentation of the NMS 130 interface in a written language specific to the analyst interacting with the network management and service provisioning solution. The use of the parser 222 and the .form files 226 enables the coding of the human-machine interface in a generic fashion.

In accordance with an exemplary implementation of the invention, the .form files 226 are written language specific and include labeling strings for each written language supported. Additional written languages may be supported via additional .form files 226. Although useful, this implementation require a coding engineer that is also versed in the specific language for which the language specific .form file 226 is coded.

However, in accordance with the preferred embodiment of the invention, the .form files 226 are written language independent providing run-time replaceable displayable string placeholders. Subject to a global register holding a specification of a specific written language to be used, each string placeholder is populated at run-time with displayable strings corresponding to a currently specified written language. In accordance with the preferred embodiment of the invention, displayable strings associated with a written language are provided via a run-time loadable 228 ".language" files 227.

Examples of network management and service provisioning context specific view panel specifications provided via .form files 226 include but are not limited to: create/configure/list/filter IP route, create/configure/list/filter IP link, create/configure/list/filter Label Switched Path (LSP), configure/list/filter IP router, configure/list/filter Label Switching Router (LSR), etc.

In accordance with the preferred embodiment of the invention, the parameter inspection view panel component, in combination with the list and filter view panel components, may be used to configure newly developed data network entities associated with the MOS 200 in a context-less fashion while pending development of context specific view panels. The development of context specific view panels includes the writing of at least one new .form file 226 associated with the newly developed data network entities—alternatively an existing .form file 226 can be modified.

Figure 5:
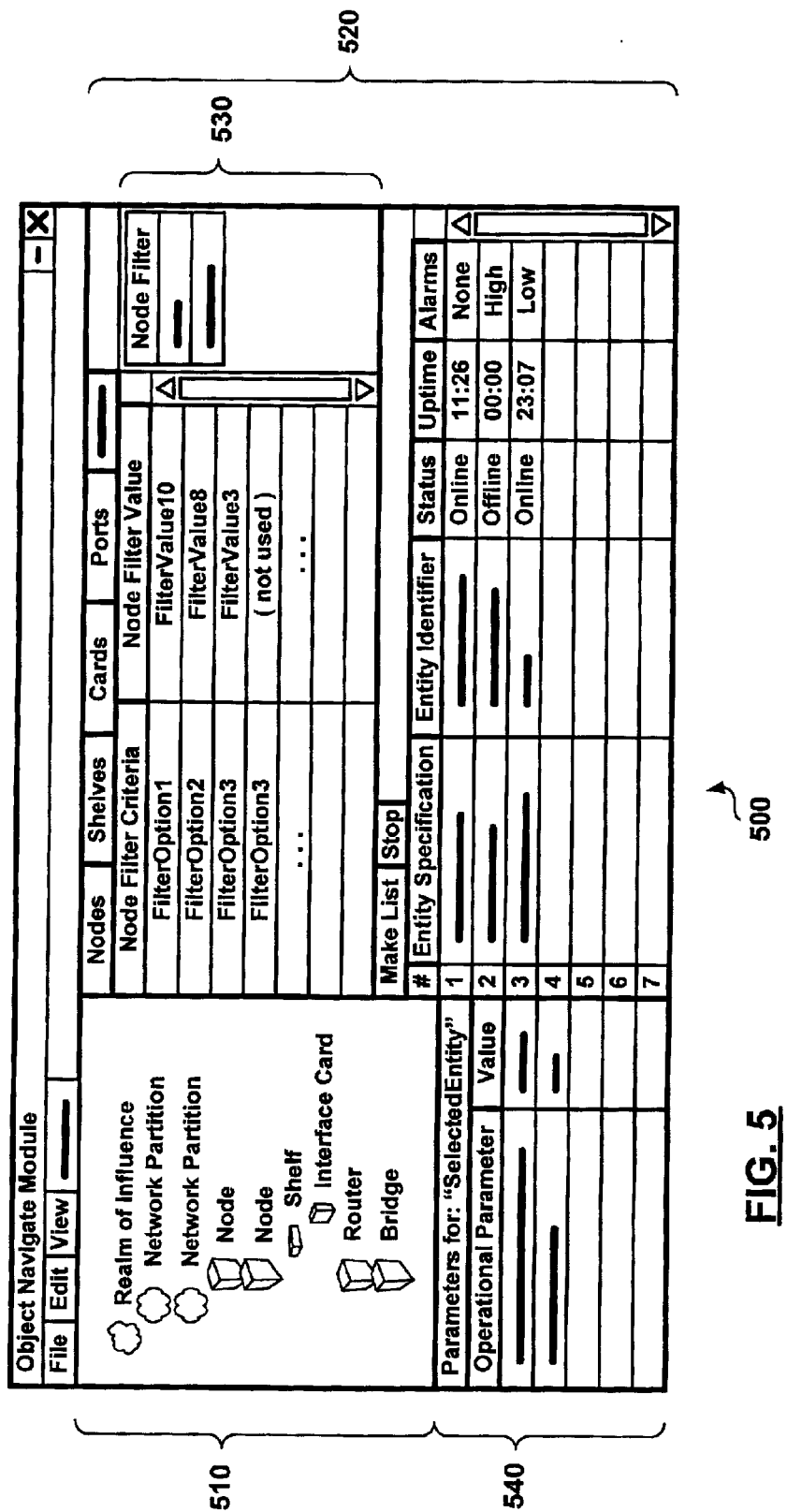
FIG. 5 is a schematic diagram showing an exemplary human-machine interface associated with a software application, in accordance with an embodiment of the invention, participating in a network management and service provisioning solution.

In accordance with the an exemplary embodiment of the invention, the functionality provided by view panel components 240 presented above is further combined to define graphical user interface application modules 260. An exemplary application module 260 is an Object Navigate Module 500. An exemplary dynamically generated view panel presented to an analyst interacting with the Object Navigate Module 500 is presented in FIG. 5. The Object Navigate Module 500 combines functionality of the tree 510, list 520, filter 530 and parameter inspection 540 view panel components.

In accordance with the invention, the application modules 260 are coded in run-time loadable fashion enabling on demand loading and registration thereof with the framework 220. Additional application modules 260 may be developed, the modularity provided requires less time to develop and is relatively less susceptible to break other code when compared to prior art solutions. Therefore less regression testing is required by implementing the methods presented herein.

In operation, the analyst interacts with the NMS system 130 and in particular the analyst interacts with displayed widgets associated with instances of view panel components 240 as dynamically configured via .form files 226. Input from the analyst is packaged in the form of commands and the commands are forwarded to the framework 220. The framework 220 inspects each received command using a command interpreter 224. Upon extracting particulars specified in a command, the framework 220 makes the particulars available to the registered modules 260.

Each registered module 260 having access to the particulars of the received command, determines whether to process the received command. On determining to process the received command, each particular module 260 makes a further determination whether the processing of the received command necessitates the instantiation of view panel components. The instantiation of view panel components uses the .form files 226 to configure the view panel components and widget attributes, to display a combination of widgets having a behavior enabling the processing of the received command.

In accordance with the invention, domain logic 208 is not coded in the .form files 226 but is made available via the MOS 200. In validating and committing changes to operational parameters (the persistence support mentioned above), commands are issued by each module 260 to the MOS 200. The MOS 200 having access to the domain logic 208 specifying viable operational parameter ranges, as well as operational parameter visibility, implements changes to operational parameters.

Operational parameter visibility rules 208 are of an important mention herein because the analyst interaction is subject to a scope-of-command and a span-of-control implemented using these rules 208. On interacting with the network management and service provisioning environment, the analyst is authenticated and subsequently authorized to perform specific actions defining the scope-of-command—the actions being allowed on specific data network entities at specific times under specific conditions defining the span-of-control.

Distributed computing techniques are used in exchanging messages carrying commands between the framework 220 and the MOS 200. A Common Object Request Broker Architecture (CORBA) bus 250 is preferably used to provide support for a distributed computing environment.

The MOS 200 brokers access to connectivity information, and perhaps to statistical information, held in the database 132. The separation between the Application modules 260 and the database 132 enables an independent development of enabling technologies 230 (including independent schema development) while enabling a generic human-machine interface development. Further the use of the framework 220 and the MOS 200 provides developers with a freedom to develop Application modules 260 and associated software applications 210 without hard-coded knowledge of manageable data network entities.

In accordance with the invention, common functionality such as managed entity selection, selection lists creation and manipulation, visual labeling of selected managed entities is provided as services associated with the framework 220. The functionality of these services provided by the framework 220 transcends the functionality of modules 260 and software applications 210. As an example, these services enable the selection of data network entities via the Object Navigation Module 500 and visual labeling thereof for display on a human-machine interface associated with the service provisioning application 216.

The .form files 226 capture functionality of the specified view panels as well as a methodology used in displaying information to the analyst in a concise, efficient, context sensitive manner. An exemplary methodology is detailed in Appendix 1.

The embodiments presented are exemplary only and persons skilled in the art would appreciate that variations to the above described embodiments may be made without departing from the spirit of the invention. The scope of the invention is solely defined by the appended claims.

Appendix 1

There are numerous configuration forms within the NMS 130 developed by many different developers, in many different groups. In the future even more diverse numbers of groups could develop features for the NMS 130 and be responsible for new configuration forms. It is essential for new development be undertaken in a consistent manner. Consistency presents a professional looking product to the analyst as well as reduce training times, allow operations within the NMS 130 to be undertaken in less time and limit the amount of customer support which vendors will be required to provide.

It is important that the order and layout of widgets within the window match the workflow of the analyst. Text fields and labels, widget selection, filtering tasks, etc., are to be positioned within the screen so that the analysts do not have to undertake excessive mouse movements or visual searches to accomplish tasks. The positioning and labeling of repeated items or item types within the different configuration forms are required to remain consistent between forms. Consistency between forms builds a confidence that will help analysts navigate through new configuration forms with fewer errors, at greater speeds and with less training.

Configuration forms are intended not to have menus and tool bars. All required commands for configuration forms should be accessed through the use of command buttons, either in a command button column or positioned next to specific areas within the form that is active. Command buttons provide the analyst with unhidden, accessible options to undertake actions within the configuration form.

Generic configuration windows should consists of the following standard items or areas:

The title bar contains the name of the configuration form and generally specifies the managed entity that is being configured.

This area contains information fields that, when filled in, will configure different parts of the network or different aspects of the network management and service provisioning solution. This section could contain standalone command buttons for undertaking specific tasks related to widgets within the view panel.

Generally, the configuration fields area should be presented as a tabbed pane that will allow view panel developers the flexibility of breaking up the fields that are required for a configuration into manageable amounts for the analyst. Also, it provides a possible simple way to add information to the form in the future.

Nested tabs within the configuration forms are not preferred. However, tabbed features within forms can be implemented without requiring the entire form to be tabbed.

The command button column should preferably have a vertical orientation and should be placed at the top right of the form.

Command buttons can be located outside of the Command Button Column. This allows buttons to be associated with the specific areas of the view panel that they influence.

A Message Bar, or text display, may be utilized for help or action notes specific to the configuration form which is being filled in. An example would be: if a value being entered into a field is out of range, it could be highlighted in this area.

A Progress Bar is preferably presented within the view panel to indicate that work is being done. Typically the progress bar is to be used for tasks that take 10 seconds or more, such as downloading information or filtering values.

Often features may be disabled (grayed out) or completely hidden to prevent analysts from accessing them (scope-of-command/span-of-control).

This happens for various reasons such as: not having appropriate access permissions to operate certain features, not having the input correct or enough information to undertake an action, not having checked off the preference which activates a feature etc.

In general, if the analyst could tinder different circumstances use a feature, then it is appropriate to gray it out. The analyst will be aware of the feature's existence and understand that actions are required to get access thereto. Grayed-out features are also valuable because they allow the analyst who is exploring an unknown program to see that they exist and have functionality.

If the analyst does not have access to features and would never have access or reason to use them, then it is appropriate not to show the feature at all. Grayed-out features which will never be used clutter the view panel, confuses the analyst and possibly increases the time taken to access the features which can be used (i.e., the analyst is required to scroll / tab though grayed-out menus, tabs and buttons etc.)

The configuration view panels will typically use two forms of error warnings:

When information is entered into or selected for a field and it is of the wrong type, the configuration form will not accept the entry and a message will typically be displayed at the bottom of the screen in a message bar.

When incorrect values have been entered and the "Ok", "Apply" or any other confirmation button is clicked, an alert error dialog window may pop-up advising the analyst that problems have been encountered.

Alert boxes convey messages and warnings to the analyst. They contain window titles, symbols, message headers, messages and command buttons.

Error alert boxes display a message describing a major problem that has been encountered and requires the analyst's intervention or correction in order to continue. Error alert boxes contain an icon representing the severity of the problem, a textual description of the error, the error number in the title and typically one button. Error alert boxes may also contain controls to correct the error. If the error cannot be corrected from the dialog box, a Close button is preferably presented. A Help button is optional (when deemed appropriate).

A button representing the corrective action may be presented if the analyst can correct the error, followed by an escape button such as Cancel, and finally Help (if deemed appropriate). Cancel would close the error alert box and cancel the operation that initiated the error.

Error alert boxes like all alert boxes are created automatically by the framework 220.

Other alert boxes can result from the use of configuration forms. Following is a brief list of the different types:

Informative alert boxes are used only for conveying information and only contain a Close button. These display a body of text typically.

Warning alert boxes prompt the user to confirm an operation. These contain a textual description and minimally two buttons. A first button typically is a Continue or Yes button that reflects the action about to be performed. A second button allows the user to back out of an operation and would typically be labeled Cancel or No, depending on the message context. If appropriate, a Help button can be added as a third button.

A default button should not be set if the action about to be performed has potentially destructive consequences.

Generic configuration forms may use two kinds of progress indications:

A Progress Indicator Bar is typically located at the bottom of the configuration form. The progress bar typically appears while filter or look-up tasks are being performed.

A Progress Dialog Box, would only appear after the configuration forms inputs have been applied though the use of an "OK" button (or equivalent). It is only to be used on those configuration forms that require a long period of time to implement previously entered information.

A Progress Indicator is typically located on the right side of the status bar. A progress indicator is used in the status bar if the application performs frequent, non-interruptive operations, likely to last more than 10 seconds. A non-interruptive operation would be one that does not require the analyst to stop working until it is complete.

If it is impossible to determine the progress of the activity towards completion (i.e., the completion point is unknown, as in a database query), then the use of a looping progress bar is preferred. A text pane can be used alongside the progress bar to give feedback on what the progress bar is indicating.

If the rate of progress towards a known completion value is known, then the use of a non-looping Progress Bar is preferred. It is preferred to indicate the percentage complete within the progress bar itself. A text pane next to the Progress bar may be used to give additional information and feedback.

A progress dialog may be used to modally display the progress of a process that the application is undertaking. It is to be used if the analyst cannot continue working until the process is done (i.e., they cannot multitask within the application). For example using a progress bar within the status bar of the primary view panel would be appropriate if the application has sent a query to a remote database, allowing the client machine to continue working. However, an action such opening a large file on the client machine would not allow for the analyst to perform other tasks, so a progress dialog would be appropriate. Progress dialogs are to be used for expected delays of more than 10 seconds. An hourglass pointer is preferably used if the delay is less than 10 seconds.

If there are multiple milestones on a long process, text updates are preferably used to keep the analyst informed.

A progress bar should contain a method of halting the task at hand. For this reason, all progress dialogs have either a Cancel or Stop button. Cancel is used if halting the process will result in returning the application to the same state as before the action was taken. Use Stop if the process changes the state of the application as it is performed (for example, deleting ifies, generating a list, etc.), or if data loss may occur. In the former case, stopping will halt any remaining changes, but will keep those performed up to that point. In the latter case, stopping should be followed with a Warning Alert box informing the analyst that there may be a loss of data.

Progress Dialogs automatically close when the action being performed is completed.

Help buttons are preferably supplied within the different configuration forms where applicable.

Tool tips are used to describe, or provide greater detail, on a widget under the system's pointer immediate location. Tool tips can be associated with widgets such as: buttons, sliders, combo boxes, icons, etc. If there is a keyboard shortcut for activation of the particular widget then the keyboard shortcut should be displayed in the tool tip.

Tool tips should be used carefully, and only if they add information. The tool tip preferably expands upon the widget's purpose. If a text label associated with the widget is specific enough, the use of a tool tip is not recommended. Tool tips presenting long, complex information (paragraphs of text, lists, a matrix of information, etc.) should be avoided.

Tool tips should appear after a system pointer hovers over a widget for more than approximately 750 milliseconds and its display should not last for more than 4 seconds.

Slightly longer of contextual help can be given in a message bar at the bottom left of the view panel as an alternative to the use of tool tips. The analyst is typically given the option to turn this feature off in a preference menu.

All actions that are required within a configuration form can be mapped to command buttons. There are two different types of command buttons, those located in the command button column at the top, right side of the form and those located next to objects within the form. Command buttons are a fast, direct and simple way for the analyst to interact with the view panel.

Command buttons are buttons within a configuration form that allow the analyst to undertake operations. Buttons that have general influence are preferably placed vertically in the command button column at the top right side of the view panel. Buttons that influence specific widgets within the view panel should be located proximally lo that widget.

An OK button is used when a dialog box requires the user to input information, make changes, etc., but the information is not submitted on the fly, i.e., the changes do not take affect until the analyst decides to save or employ them by pressing OK. If OK is used, no mnemonic is applied. Actuation of the OK button will result in the changed or entered data within the form being saved and the form being closed.

A dialog window can be used to ask the analyst if the "OK" action should be undertaken as well as to indicate if changes were made to the object being configured simultaneously by another analyst.

In configuration forms the Save button is used to submit changed or new data entered into a form without closing the form.

The Close button is used in a dialog box that does not require the analyst to input any information, or the input is performed on the fly. Examples would be in an information alert box that just displays a text message to the user, or a dialog that contains a slider bar whose values are translated to the main application on the fly.

Cancel is used in the same dialog boxes where an OK button occurs. It closes the window without applying the user's changes or input. Cancel does not have a mnemonic applied to it.

The Help command button launches context sensitive online documentation.

A command button can be set as the default button for a configuration form. That is, pressing return will trigger the button. Default buttons add speed and convenience to dialog boxes. However, the use of a default button is not recommended if the action is a destructive one. Default buttons do not have mnemonics. Default buttons have a thicker border surrounding them.

Command buttons which when actuated open view panels, should have ellipses, placed after their label text.

Command buttons with ellipses are appropriate for opening view panels that the analyst can choose something from, such as selecting path endpoints. Also, they can be used for bringing up centralized functions, such as connection scheduling or filtering resources for network information. However, command buttons with ellipses are not intended to be replacements for tabs within configuration forms.

Stand alone command buttons are located next to the objects in the view panel which they directly influence. If a command button only influences one item within the view panel then it should be located next to that item.

Listed below are a selection of widgets.

An editable field is used to input alphanumeric data into a configuration form. Once the text field is clicked or tabbed to, a blinking insertion point indicator appears within the field.

The editable field is also used for strings of editable text.

A non-editable text field is used to show alphabetical, numeric, and alpha-numeric data to the analyst. The analyst can copy the information within the field, but the field cannot be modified.

Non-editable text fields are used for strings of read only textual information that are generally less than 40 characters long.

A text area is used to input large amounts of alphanumeric data into a configuration form. A text box size used should be wider than it is tall (a rectangle) and of a useful width (30 characters) so that it can be read without spreading the information over too many lines. The text area is typically used when many sentences or more than one line of text are required.

A slider scale is a visual way for the analyst to select a value within a configuration form which usually is qualitative in nature. The slider should be made up of a label, followed by a slider, and finally followed by a editable field (which is optional depending on the nature of the values being entered). The slider scale is typically used to select a value from a range of values or states.

A table is a titled grid of information used to show large sets of data which are required to be entered into a configuration form.

A check box list is composed of an over all label positioned next to a series of check boxes that are each associated with a label.

The check box is a preferred way of selecting multiple items from a list. It provides the analyst with a flat view of all the options facilitating utility and expediency within the view panel.

A radio button is the preferred way of selecting a single item from a list. It provides the analyst with a flat view of all the options facilitating utility and expedience within the view panel.

A scroll pane enables the analyst to control the view of what is being displayed at any time. It consists of a vertical or horizontal "channel" through which a scroll box is moved. Each end of the channel has a scroll arrow.

Configuration form scroll bars are used only within widgets (e.g. combo boxes etc.)

A group box is a non-interactive widget which associates related items within configuration forms (e.g. they all control the same data network entity). The group box has a label and a border.

Group boxes should only be used where a distinct group of items require separation from the rest of the form. Group boxes should almost never be used to surround one item.

A list box is a box containing items which can be selected or multi-selected. It can contain check boxes or radio buttons as well as scroll bars. The list box is used when the analyst is required to make multiple selections of a list of options.

A combo box is an editable or non-editable value field that has a drop-down arrow and drop-down list of possible selections associated with it.

Following are typical uses of the combo box:

The Combo Box is used to seled a single item from a group of items.

In non-editable combo box's choice is limited to the elements in the drop-down list.

In editable combo boxes the analyst can choose from the drop-down list or enter a unique value in the field. Providing a list of typical selections speeds up the time it takes for the analyst to complete configuration forms.

A spin box is a widget which allows the user to select a value for a field by clicking on up and/or down arrows which are associated therewith.

Spin boxes may have the following drawbacks if used incorrectly:

Spin boxes increase the chance of errors.

The up and down arrows are small, hard to hit targets.

The analyst is prone to getting lost if the set of data that is being selected through the spin box is too large.

A Tab is a way in which the form developer can add multiple panes of information in one configuration form. Tabs preferably should run along the top of the areas that they affect. The tab that is being viewed is to be shown connected to the pane, while the ones not being viewed are in the background. The analyst is required to click on a tab to view the contents of the associated view pane. All changes made on multiple tabs will be saved upon the analyst's confirmation by clicking the "OK" (or "Apply", "Save" etc.) command button.

When a series of distinct groups of objects to configure exist and there is not enough room to put them all on one pane, tabs can be used to break up the groups and allow the analyst to inspect and configure them one at a time.

A Paste button is used to paste the Selected Object from the Selected Object Window into an area. The Paste button is used in any situation that requires the analyst to paste information from one area to another.

We claim:

1. A graphical user interface framework for a network management and service provisioning workstation of a managed communications network, the framework comprising:
   a. a plurality of generic panel components for displaying to a user network management and service provisioning information regarding a managed network entities and for receiving user input;
   b. a plurality of view panel descriptor files, each descriptor file including information specifying the configuration of a corresponding generic view panel component;
   c. a plurality of rules for specifying valid interactions with attributes of network entities managed by the network management and service provisioning workstation; and
   d. machine logic for selectively configuring at run-time at least one generic view panel component in accordance with the specification detailed in the corresponding descriptor file to display a view panel instance on a display interface in response to user input.

2. The graphical user interface framework claimed in claim 1, wherein each generic view panel component further comprises at least one widget facilitating human machine interaction, the run time configuration of the generic view panel component provides for a dynamic configurable human machine interface.

3. The graphical user interface framework claimed in claim 2, wherein information held in each descriptor file further comprises a specification of at least one widget attribute.

4. The graphical user interface framework claimed in claim 2, wherein information held in each descriptor file further comprises a specification of at least one widget attribute rule.

5. The graphical user interface framework claimed in claim 4, wherein each widget attribute rule further comprises an indication of at least one allowable action to be performed on the at least one widget.

6. The graphical user interface framework claimed in claim 2, wherein the generic view panel component includes an error handling routine for processing input.

7. The graphical user interface framework claimed in claim 1, further comprising a command interpreter for interpreting at least one received command wherein selectively configuring at least one generic view panel, the machine logic is further responsive to command.

8. The graphical user interface framework claimed in claim 1, wherein the machine logic further comprises an access routine implementation used by the framework to interact with a managed object server brokering access to a plurality of manageable entities object instances corresponding to managed data network entities in providing network management and service provisioning solutions.

9. The graphical user interface framework claimed in claim 8, wherein the framework further comprises messaging means for sending a message to the managed object server in interacting therewith.

10. The graphical user interface framework claimed in claim 9, wherein the message further encapsulates a command.

11. The graphical user interface framework claimed in claim 8, wherein the machine logic further comprises validation means for validating brokered access to the manageable object entity instance.

12. The graphical user interface framework claimed in claim 8, wherein the machine logic further comprises a commit routine implementation used by the framework for committing changes to attributes associated with at least one managed data network entity instance.

13. The graphical user interface framework claimed in claim 1, wherein the framework is operable to enable the registration of a application module adapted to interwork with the framework, the registration of the application module with the framework provides an independent development of the framework from the development of the application module.

14. The graphical user interface framework claimed in claim 13, wherein the framework further comprises a module registration routine enabling the registration of a JAVA plug in module.

15. The graphical user interface framework claimed in claim 1, wherein each descriptor file comprises a human readable file.

16. The graphical user interface framework claimed in claim 15, wherein the descriptor file comprises an eXtensible Markup Language (XML) file.

17. The graphical user interface framework claimed in claim 1, further comprising a parser for run-time loading the at least one descriptor file in configuring an instance of a corresponding view panel, the run-time loading of the descriptor file by the framework provides for a dynamic configuration of network management and service provisioning workstation display interface.

18. The graphical user interface framework claimed in claim 1, wherein a generic view panel component is one of: an entity listing view panel component, an entity list filtering view panel component, an entity free creation view panel component, an entity parameter inspection view panel component, an entity inclusion view panel component, an entity creation view panel component, a validation view panel component, and a commit view panel component.

* * * * *